United States Patent [19]

Tuovinen et al.

[11] 4,222,786

[45] Sep. 16, 1980

[54] FERROCHROMIUM SLAG FOR USES REQUIRING REFRACTORINESS AND MECHANICAL STRENGTH

[75] Inventors: Frans H. Tuovinen, Ulvila; Matti E. Honkaniemi; Matias A. Virta, both of Tornio; Helge J. Krogerus, Pori, all of Finland

[73] Assignee: Outokumpu Oy, Helsinki, Finland

[21] Appl. No.: 27,009

[22] Filed: Apr. 4, 1979

[30] Foreign Application Priority Data

Apr. 18, 1978 [FI] Finland .................................. 781180

[51] Int. Cl.$^2$ .............................................. C04B 7/14
[52] U.S. Cl. ..................................................... 106/117

[58] Field of Search ........................ 106/51, 103, 117; 75/24, 30; 65/19, 20

[56] References Cited

U.S. PATENT DOCUMENTS

| 3,106,447 | 10/1963 | Charvat | 75/30 |
| 3,798,043 | 3/1974 | Wallouch | 106/117 |

*Primary Examiner*—James Poer
*Attorney, Agent, or Firm*—Brooks, Haidt, Haffner & Delahunty

[57] ABSTRACT

A ferrochromium slag for use as a refractory material having good resistance to mechanical compression and wear is disclosed to contain less than 25% by weight of MgO.

5 Claims, No Drawings

FERROCHROMIUM SLAG FOR USES REQUIRING REFRACTORINESS AND MECHANICAL STRENGTH

BACKGROUND OF THE INVENTION

The present invention relates to a ferrochromium slag which is intended for uses requiring refractoriness and resistance to mechanical pressure and wear, e.g. for use as blasting sand or as an aggregate in cast concrete, asphalt or bricks.

U.S. Pat. No. 3,798,043 discloses a method of preparing refractory concrete from the slags of ferrochromium production. The ferrochromium slag used contained 25-40% MgO, 20-50% $SiO_2$, 10-40% $Al_2O_3$ and less than 15% by weight Cr, $Cr_2O_3$, CaO, FeO, C and S. Classified ferrochromium slag was blended with the calcium aluminate cement used as the cementing agent and with water, and possibly with ground boron phosphate serving as a fluxing agent. The ratio of cement to slag was 1:4, and a castable blend was obtained by adding so large a quantity of water that the ratio of water to cement was 0.6. Finally the castings were heat treated at a temperature above 1000° C.

The object of the present invention is to provide a slag of ferrochromium production which is usable for purposes in which it is subjected to fire and to mechanical strains and which could as such be used, for example, as blasting sand or as aggregate in cast concrete, bricks, road surfacing materials, or the like. The object of the invention is, furthermore, to provide a ferrochromium slag which gives such materials strength properties improved over those obtained using the above-mentioned prior known ferrochromium slag.

SUMMARY OF THE INVENTION

According to the invention, it has now been surprisingly observed that the above objects are achieved by using a ferrochromium slag which contains magnesium oxide less than 25% by weight, i.e. less than the above-mentioned prior known ferrochromium slap used as an aggregate in refractory concrete.

The ferrochromium slag according to the invention can be used as an aggregate in bricks and in ceramic blends which must resist fire and high mechanical strains, such as asphalt, bricks and cast concrete, or it can be used as such as blasting sand.

DESCRIPTION OF THE PREFERRED EMBODIMENTS

By mixing a classified ferrochromium slag which contains magnesium oxide less than 25% by weight and calcium aluminate cement, a firm blend which cements hydraulically at room temperature is obtained. When heat treated in air at a temperature above 1200° C. it gives a strong ceramic bond and strength properties at least as good as those of conventional concretes and better than those of the prior known concretes in which part of the cement has been replaced with ferrochromium slag containing magnesium oxide more than 25% by weight.

The applicability of ferrochromium slags of various types to the above-mentioned uses was studied. Test specimens for the determination of compressive strengths were first sawn, using a diamond saw, from slags of various types.

EXAMPLE 1

Example of cold compressive strengths of slags of various types

Table 1

| Slag | Chemical analysis | | | % by weight[1] | Cold compressive strength |
| | MgO | CaO | $SiO_2$ | $Al_2O_3$ | kgf/cm² |
|---|---|---|---|---|---|
| 1 | 24.0 | 5.0 | 28.5 | 24.7 | 3030 |
| 2 | 26.5 | 4.7 | 26.8 | 23.2 | 1630 |
| 3 | 34.2 | 1.4 | 30.0 | 20.8 | 1300 |
| 4 | 19.1 | 5.1 | 34.7 | 28.3 | 2834 |
| 5 | 13.1 | 5.2 | 39.2 | 33.2 | 2816 |

[1] The balance is mainly Cr, $Cr_2O_3$, Fe, FeO

Experimental bricks were made from slags 1 and 3 having Secar cement as the cementing agent, using a 20-percent blend, and subsequently they were sand blasted using various blasting angles and blasting times. The following specific wears were obtained for the volume of the depression produced by the blasting:

Slag 1: 198.1 kg sand/cm³ (volume of depression)
Slag 3: 137.2 kg sand/cm³ (volume of depression)

In investigations it was found that if the MgO content in the slag increases above 25% the strength properties of the slag decrease considerably and at the same time the slag becomes unsuitable for uses requiring resistance to wear. The so-called Los-Angeles determination for road construction was performed on Slag 1. Its Los-Angeles number was $\leq 20$, and consequently, the said slag type is a suitable raw material for road construction projects requiring resistance to wear.

The slag was crushed to a particle size of under 5 mm and the suitable fractions were blended with calcium-aluminate cement (20% of the blend) and experimental bricks were made by wet compression for sand blasting tests. On the basis of the tests it was observed that the test specimens made from slag 1 resisted wear to an equal degree as the best aloxy brick/blend types and certain SiC brick types.

The purpose was to find a suitable material for a cyclone and its gas pipes, in which erosive chromite concentrate is preheated to approx. 800° C. by means of hot flue gases from a cylinder furnace. For this purpose a sand blasting test was performed on various brick types. The following table shows results of the sand blasting test when sand was blasted onto the surfaces of the bricks at various angles and using various blasting times. The volumes of the depressions produced by the blasting were determined.

Table 2

Results of sand blasting tests

| Brick type | Volume of depression, cm³ |
|---|---|
| 1. Silicon carbide brick, type 1 | 7.1 |
| 2. Corundum brick | 8.4 |
| 3. Silicon carbide brick, type 2 | 8.6 |
| 4. Grinding ball, porcelain | 9.9 |
| 5. Silicon carbide brick, type 3 | 11.3 |
| 6. Test specimen made from FeCr slag[1] | 15.2 |
| 7. Silicon carbide brick, type 4 | 17.1 |
| 8. Aloxy brick, $Al_2O_3$ = 65% | 20.2 |
| 9. Aloxy brick, $Al_2O_3$ = 50% | 20.7 |
| 10. Chamotte brick, type 1 | 24.2 |
| 11. Chamotte brick, type 2 | 36.7 |

[1] Suitably fractionated FeCr slag and 20% Secar cement in a blend.

Test briquets, φ 20×20 mm, were made from fractionated slag 1 for compressive strength determinations. Calcium aluminate cement, "Secar 250" (manufacturer: Lafarge Aluminous Cement Company Limited), was used as the cementing agent at a proportion of 25% of the weight of the slag and, in addition, water at a proportion of 10% of the weight of the blend. The briquets were dried and burned in an atmosphere of air at various temperatures for 2 hours, whereafter they were cooled and the cold compressive strengths were determined.

EXAMPLE 2

The purpose was to replace expensive calcium aluminate cement partly with suitable inexpensive additions, such as industrial wastes. Briquets were made from slag, various additions, and cement, and the briquets were treated as described above and the compressive strengths were determined. The particle size of the additions was of the grade of fineness of cement. The additions were fly ash produced in the burning of coal, sulfur-removal slag from the AOD process, natural clay, and finely-ground granulated ferrochromium slag.

The following table shows the results of compressive strength determinations with different blends.

Table 3

Compressive strength determinations with various blends; briquet size φ 20 × 20 mm; heat treatment 2 h at each temperature in an atmosphere of air.

| Temperature °C. | "Secar 250"[1] kgf/cm$^2$ | "Secar 250"[2] Fly ash kgf/cm$^2$ | "Secar 250"[3] S-removal slag kgf/cm$^2$ | "Secar 250"[4] Natural clay kgf/cm$^2$ | "Secar 250"[5] FeCr slag kgf/cm$^2$ |
|---|---|---|---|---|---|
| 110 | 218 | 202 | 178 | 222 | 192 |
| 600 | 212 | 156 | 161 | 198 | 196 |
| 1000 | 184 | 174 | 145 | 187 | 210 |
| 1200 | 220 | 218 | 210 | 222 | 220 |

[1] cement 25% of the weight of slag
[2] cement 15% of the weight of slag + fly ash produced in the burning of coal 15%
[3] cement 15% of the weight of slag + sulfur-removal slag from AOD process 10%
[4] cement 15% of the weight of slag + natural clay 15%
[5] cement 15% of the weight of slag + finely-ground granulated FeCr slag 10% (3000 Baines).

On the basis of the tests it could be observed that approx. 40% of the cement can be replaced with the above additions without decreasing the compressive strength.

Table 4

Chemical analyses of the cement and the additions

| Component | "Secar 250" % by weight | Fly ash % by weight | S-removal slag % by weight | Natural clay % by weight |
|---|---|---|---|---|
| SiO$_2$ | 0.4 | 53.0 | 26.0 | 59.0 |
| Al$_2$O$_3$ | 71.0 | 24.0 | 2.5 | 16.0 |
| MgO | — | 3.0 | 5.7 | 4.3 |
| CaO | 27.0 | 0.8 | 60.0 | 2.4 |
| Fe$_2$O$_3$ | 0.4 | 8.4 | 0.6/FeO | 7.3 |

A casting concrete blend was prepared from ferrochromium slag (−5 mm, fractionated) and "Secar 250" cement, and this blend was tested in practice in various uses. In the uses described below it was possible to replace fully the previously used commercial materials.

Examples of uses in which the ferrochromium slag according to the invention was tested:

Casting ladle

For example, a lining for a ferrochromium ladle was cast from the slag blend, and it sustained 82 immersions. The temperature of the molten slag was approx. 1670° C. and that of the molten metal 1570° C. Normally a chamotte brick and aloxy brick lining is used in the ladle.

Planetary coolers of cement furnaces

The coolers were lined with a slag blend, which has worn well in them. The lining is subjected to a vary high mechanical wear (cooling of clinker) and the maximum temperature is ≦1200° C. High alumina blends and bricks are often used for the said purpose.

Purification cyclones and pipes for solid-bearing hot and cold process gases A lining was cast from slag blend for a cyclone in which air is mixed with flue gases from a cylinder furnace for burning.

The flue gas also contains coal dust, which has an erosive effect. The maximum temperature of the gas is 550° C. and the atmosphere is an oxidizing one. The lining has resisted wear for already 8 months.

In addition, a lining for a purification cyclone for a flue gas which contains chromite dust was cast from the slag; this lining has resisted wear for approx. 4 years. The temperature of the flue gas is approx. 200° C.

Normally, silicon carbide and aloxy bricks and blends are used for the above purposes.

Melt casting gutters, iron and non-ferrous metal industry: Slag blend was cast into casting gutters for, for example copper metal and copper matte, T=1200° C., where it has resisted wear longer than respective aloxy-based blends.

In addition, casting gutters (T=1570° C.) for ferrochromium melt and casting troughs were lined with a slag blend; it replaced aloxy bricks and blends.

In addition, the slag blend has been used in various industrial plants as a material for floors which are exposed to thermal strain and very high mechanical wear. In these uses the resistance of the slag blend has been excellent.

Some other uses have included
blasting sand
asphalt aggregate
cement-based, for special purposes in road construction, e.g. bridge structures and road curves.

The high resistance of the blend type to thermal shocks has also been observed in various uses.

The ferrochromium slag according to the invention can also be cast as such in molten state into tiles which are refractory and, furthermore, resistant to even very high mechanical strain, or ferrochromium slag in particle form can be compressed under high pressure into fragments which are sintered into bricks by heat treatment.

What is claimed is:

1. A refractory ferrochromium slag with good resistance to mechanical compression and wear, comprising magnesium oxide less than 25% by weight.

2. The ferrochromium slag of claim 1, comprising 13 to 24% by weight of magnesium oxide.

3. The ferrochromium slag of claim 1, comprising finely-ground granulated ferrochromium slag having a particle size under 5 mm.

4. The ferrochromium slag of claim 1, comprising calcium oxide 1 to 12 % by weight, silicon oxide approx. 20 to 40 % by weight, and aluminum oxide approx. 20 to 36 % by weight.

5. The ferrochromium slag of claim 1 in the form of melt-cast profile or casting.

* * * * *

UNITED STATES PATENT AND TRADEMARK OFFICE
CERTIFICATE OF CORRECTION

PATENT NO. : 4,222,786
DATED : September 16, 1980
INVENTOR(S) : Frans H. Tuovinen et al It is certified that error appears in the above-identified patent and that said Letters Patent are hereby corrected as shown below:

Column 1, line 42:

"slap used as an" should be --slag used as an--.

Column 4, line 46:

"example copper metal" should be --example copper melt--.

Column 6, line 5:

Claim 4: "calcium oxide 1 to 12%" should be

-- calcium oxide 0 to 12% --.

Signed and Sealed this

Third Day of March 1981

[SEAL]

Attest:

RENE D. TEGTMEYER

Attesting Officer     Acting Commissioner of Patents and Trademarks